Sept. 7, 1965
G. J. OLSON
3,204,435
PELT STRETCHING DEVICE
Filed Feb. 26, 1963
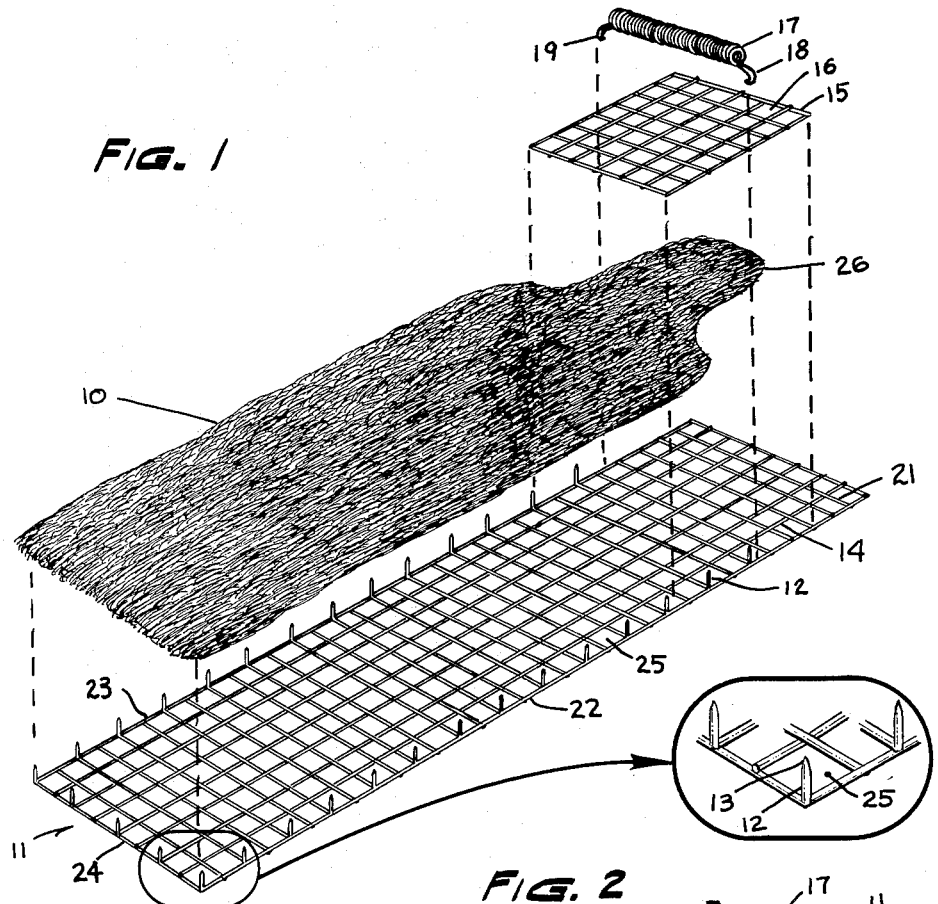
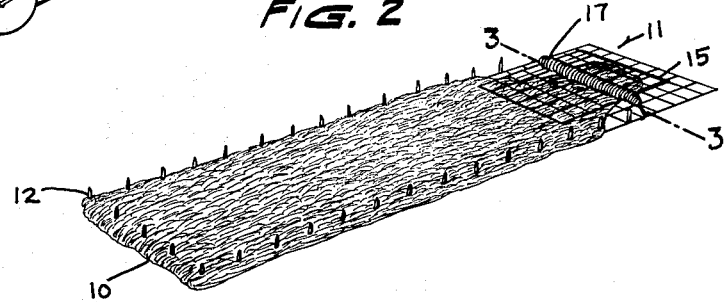
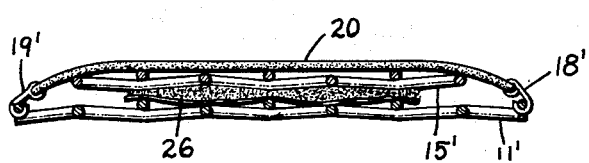
GORDON J. OLSON,
INVENTOR.
BY *John P. Mann*
ATTORNEY 3,204,435
PELT STRETCHING DEVICE
Gordon J. Olson, R.R. 4, Waupaca, Wis.
Filed Feb. 26, 1963, Ser. No. 261,112
5 Claims. (Cl. 69—19.1)

The present invention relates to devices for stretching and drying animal pelts and more especially the pelts of animals having relatively low fur density pelt areas.

One of the most demanding steps in the preparation of an animal pelt before it becomes part of a fur garment is the stretching and drying of the skin after it is stripped from the animal carcass. Conventional methods require that the pelt be placed on a relatively soft stretching board, anchored by individually placing pins along one side thereof, stretching to shape and, finally placing other pins along the free side of the pelt. To add to the difficulty of thus stretching a pelt the neck and head areas of some small animal pelts, and in particular the chinchilla, have areas on the pelt where the fur density is relatively low. It is desirable that these areas be allowed to contract or shrink during the drying period thereby increasing fur density. Thus these low density areas should be pinned rather loosely. This method is one which requires a great deal of time for the operator of a commercial animal ranch.

My invention not only expedites the pelting process but has the added advantage of producing a more uniformly stretched skin with even overall fur density. This is done by providing a mounting board having a series of pins spaced partially around the periphery thereof which extend normal to the surface of the board. The board itself is preferably perforated to allow air to reach the underside of the pelt for better drying. A small plate, also preferably perforated, is placed over the head area of the pelt and held in place with an elastic band eliminating the need to pin at this point and thereby allowing the low fur density neck area to contract freely.

A primary object of my invention is to provide a pelt stretching device which will greatly reduce the time required to both mount the skin in its drying position and to remove said pelt when drying is complete.

Another important object of my invention is to provide a pelt stretching device in which the neck area of the pelt will be able to contract freely thus producing a high fur density neck area on the pelt.

Still another object of my pelt stretching device is to allow drying air to reach all areas of the pelt.

Other objects and advantages of my invention will be understood from the following description and claims in conjunction with the accompanying drawings which show by way of example preferred embodiments of the invention and in which:

FIGURE 1 is an exploded perspective view showing the parts of the invention in their relation to an animal pelt.

FIGURE 2 is a perspective view of the invention in its assembled form with an animal pelt in its stretch position ready for drying.

FIGURE 3 is a section view of line 3—3 of FIGURE 2 showing a second retaining member.

Referring now to the drawings, the baseboard 11 of my invention provides a generally flat surface against which an animal pelt may be placed for drying. This step in the tanning process of an animal pelt occurs immediately after the pelt is taken from the carcass and extends until the natural liquids in the skin are dried off leaving the fiberous hide with the fur extended therefrom This board 11 is preferably made from a stiff material dimensioned to accommodate the particular skin for which it is to be used. For example, in the case of the chinchilla the board is approximately four inches wide by sixteen inches long.

Board 11 may be provided with a series of perforations 25 which could be punched or drilled or the board may be formed from a sheet of open mesh wire cloth having cross wires 21 and lengthwise wires 14 such that said perforations are formed naturally. The perforated board allows air circulation across the underside of the pelt thereby expediting the time required for drying and producing an improved pelt.

Board 11 is further provided with a plurality of pins 12 having sharpened ends 13. These pins extend upwardly, preferably perpendicular to the plane of base 11, and are spaced along the long sides 22 and 23 of board 11 and along one short side 24 thereof. Said pins 12 are preferably spaced at intervals of approximately one inch and are about three-eighths inch long. Other spacing and pin lengths could obviously be used and I do not wish to limit myself to these parameters.

Cover plate 15 is smaller in extent than board 11 and is adapted to overlie the head area of an animal pelt 10 as shown in FIGURE 2. It is made of relatively stiff material in much the same manner as the board 11 and is, also preferably perforated by holes 16. The perforation of the cover plate 15 is a preferred embodiment of my invention but the successful function of my invention is not limited thereto and I do not wish to be limited to this feature in this invention element.

A biasing element such as coil spring 17 has hooked outer ends 18 and 19 and is adapted to press cover plate 15 against the head area 26 of the animal pelt 10 when mounted to board 11. Hooked ends 18 and 19 engage sides 22 and 23 respectively of board 11 and, because of the biasing effect of the spring 17, the pelt 10 is pressed against the board 11.

A second embodiment of this biasing element is shown in FIGURE 3 in which the pelt 10' is placed on board 11' with the head area of the pelt held by cover plate 15'. An elastomeric band 20 having hooks 19' and 18' fastened to the respective ends thereof provide the necessary pressure to hold the plate tightly against the head area 26. This elastomeric band may be made from any material which is elastomeric in nature such as rubber, neoprene, or Buna N.

In use my pelt stretching invention has a pelt 10 placed over the board and forced onto the pins 12 such that said pins pierce the pelt skin as shown in FIGURE 2. As seen in the figures the pelt head area is not pinned. The pelt is, thus, tightly held in place ready for drying without the usual time consuming practice of placing individual pins through the pelt. The cover plate 15 is then placed over the head area 26 of the pelt 10 and pressed downwardly against the pelt thereby forcing the head portion thereof down against the mounting board 11. End 18 of spring 17 is then hooked to side 22 of board 11, stretched across cover plate 15 and end 19 hooked to board side 23. The pelt is then mounted ready for drying with the body portion of the pelt held by the pins 12 and the weaker head portion of the pelt held by the cover plate 15.

To remove the pelt, after drying, spring 17 is taken off thereby freeing cover plate 15. After removal of this plate the head area of the pelt is grasped firmly by the hand and the entire pelt is stripped from the mounting board 11 in one motion.

It will be apparent to those skilled in the art that various changes and modifications may be made in the embodiments described and illustrated without departing from the scope of the invention as defined in the appended claims. It is intended, therefore, that all matter contained in the foregoing description and in the drawings

I claim:

1. In combination, a perforated baseboard having a double row of substantially parallel and spaced sharpened pins extending normal to the plane thereof and upon which an animal pelt may be stretched and held, a perforated plate member smaller in extent than said base which may be placed over an unpinned portion of said pelt and a retaining means to hold said pelt tightly between said baseboard and said plate by fastening to said baseboard and overlying said plate.

2. The device of claim 1,
wherein the retaining means comprises an elastomeric band having hooks on the ends thereof.

3. A pelt drying frame comprising a rectangular base member having a plurality of spaced upwardly projecting pins along the long sides and one short side of said base such that an animal skin may be placed thereover and held in a drying position, a head holding member substantially equal in width to said base member and shorter in length than said base member and adapted to hold the head portion of an animal pelt against said base member, and a biasing member to maintain said head portion holding member in pressure contact against said pelt.

4. The device of claim 3 wherein the base member is formed of a heavy gage woven wire grid.

5. The device of claim 3 wherein the biasing member comprises a coil spring having hooks formed on the ends thereof.

References Cited by the Examiner

UNITED STATES PATENTS

| | | | |
|---|---|---|---|
| 1,519,854 | 12/24 | Lockwood | 24—73.12 |
| 1,669,275 | 5/28 | Ayres et al. | 45—24 |
| 2,599,199 | 6/52 | Roberts | 45—24 |
| 2,810,231 | 10/57 | Lykes | 45—61 |

JORDAN FRANKLIN, *Primary Examiner.*

FRANK B. SHERRY, *Examiner.*